United States Patent
Lee et al.

(10) Patent No.: US 6,809,737 B1
(45) Date of Patent: Oct. 26, 2004

(54) METHOD AND APPARATUS FOR SUPPORTING MULTIPLE MONITOR ORIENTATIONS

(75) Inventors: Keith Lee, Markham (CA); Jacky Yan, Richmond Hill (CA); Lili Kang, Don Mills (CA)

(73) Assignee: ATI International, SRL, Hastings Christ Church (BB)

(*) Notice: Subject to any disclaimer, the term of this patent is extended or adjusted under 35 U.S.C. 154(b) by 0 days.

(21) Appl. No.: 09/390,261

(22) Filed: Sep. 3, 1999

(51) Int. Cl.$^7$ .............................. G06F 13/28
(52) U.S. Cl. ................ 345/533; 345/503; 345/545; 345/568
(58) Field of Search ............... 345/503, 519, 345/531, 533, 545, 557, 568

(56) References Cited

U.S. PATENT DOCUMENTS

| | | | | |
|---|---|---|---|---|
| 5,920,688 A | * | 7/1999 | Cooper et al. | 345/650 |
| 5,956,049 A | * | 9/1999 | Cheng | 522/160 |
| 6,088,046 A | * | 7/2000 | Larson et al. | 345/538 |
| 6,141,021 A | * | 10/2000 | Bickford et al. | 345/503 |
| 6,215,497 B1 | * | 4/2001 | Leung | 345/419 |
| 6,226,016 B1 | * | 5/2001 | Chee et al. | 345/571 |
| 6,262,751 B1 | * | 7/2001 | Chan | 345/545 |

FOREIGN PATENT DOCUMENTS

EP    0 431 581 A2 * 6/1991

* cited by examiner

Primary Examiner—Ulka J. Chauhan
(74) Attorney, Agent, or Firm—Vedder, Price, Kaufman & Kammholz

(57) ABSTRACT

In accordance with a first mode of operation of the present invention, a portrait image is received from a system device. The portrait image is translated and stored within the graphics engine memory such that it can be displayed on a landscape monitor that has been rotated 90 degrees. Likewise, when portrait data stored within the memory is sent to the system it is translated such that it is sent back in the same format received by the system. In a second mode of operation in accordance with the present invention, a landscape image received by the graphics adapter is stored in the graphics adapter memory without any translation.

11 Claims, 10 Drawing Sheets

| Address A( ) | CONTENTS W/O TRANSLATION | CONTENTS WITH TRANSLATION |
|---|---|---|
| X | 1 | N |
| X+1 | 2 | (2N) |
| . . . | | |
| X+N | N | (M-2)N |
| X+N+1 | N+1 | M N |
| . . . | | |
| X+(M-2)N+1 | (M-2)N+1 | (N+2) |
| X+(M-1)N+1 | (M-1)N+1 | (N+1) |
| . . . | | |
| | | (M-2)N+1 |
| X+MN | M N | (M-1)N+1 |

FIGURE 6

METHOD AND APPARATUS FOR SUPPORTING MULTIPLE MONITOR ORIENTATIONS

FIELD OF THE INVENTION

The present invention relates generally to the display of graphics data, and more specifically to the display of graphics data in portrait and landscape mode.

BACKGROUND OF THE INVENTION

Computer systems and their associated peripherals are well known. For example, modern day computer systems are known to include a central processing units (CPUs), memories, system busses, video graphics adapters, and display devices. Examples of display devices include cathode ray tube (CRT) monitors, and digital flat panel (DFP) monitors. DFP monitors include liquid crystal displays and active matrix display monitors commonly associated with laptop computers.

Traditionally, monitors are oriented such that images are viewed in a landscape mode. In landscape mode, images have a greater horizontal viewing dimension than vertical viewing dimension. For example, the horizontal viewing dimension of a traditionally oriented monitor is 640 pixels wide while the vertical viewing dimension is 480 pixels high. While landscape monitors are commonly associated with computer systems, some computer applications are best viewed in a portrait mode. In portrait mode, the number of vertical pixels associated with a viewed image is greater than the number of horizontal pixels.

An example of an application that is better supported in portrait mode is a word processing application, where it would be desirable to display a full size representation of an 8½ by 11 sheet of paper on the monitor. A horizontally oriented landscape display is typically not capable of displaying a full size representation of an 8½ by 11 sheet of paper.

In order to support landscape mode dimensions, dedicated landscape monitors have been developed. Landscape monitors are oriented such that the horizontal scan pixel width is greater than the vertical pixel height. By using a landscape monitor, applications that benefit by their use can be supported. In addition, large landscape monitors have been developed such that the vertical height of the landscape monitor is large enough to support the desired applications.

A disadvantage associated with portrait monitors and large monitors, is their high cost and low convenience. Specifically, where large horizontal monitors are used in order to support the desired vertical height, the cost of such monitors can become prohibitive from many consumers. Likewise, the acquisition of a dedicated portrait monitor limits a systems use to applications specifically designed for landscape monitors.

In order to overcome the cost and convenience issues associated with dedicated portrait and large landscape monitors, rotatable monitors have been developed. By supporting a monitor capable of being rotated, or pivoted, it has been possible to support both landscape and portrait m odes of operation through the use of system software drivers. Even though the dual mode monitor is being used in multiple modes, it will have a single scan pattern. Generally, when in a landscape mode, the scan pattern is horizontal from left to right beginning at the top of the monitor, as referenced by the viewed image. Therefore, it is necessary to re-map data to be displayed in portrait mode to be supported by a horizontal mode monitor and display driver.

When a central processor unit provides display data in a traditional landscape mode, the data is received directly by a graphics adapter and subsequently displayed upon the display device in landscape mode. However, in the prior art, when the central processing unit, or other host, provides portrait images for display on a landscape monitor, the image is translated such that it is displayed appropriately. In the prior art, this has been accomplished by utilizing special software drivers on the CPU in order to re-map the image such that it would be stored appropriately at the video graphics adapter for display upon the display device.

One problem associated with software re-mapping of images, is the overhead required by the system processor in order to re-map each and every frame associated with the images being displayed.

Therefore, a method and apparatus which reduces the amount of system CPU overhead associated with translating images from a landscape mode to a portrait mode would be desirable.

BRIEF DESCRIPTION OF THE DRAWINGS

FIG. 6 illustrates a linear memory map of the pixels of FIG. 5;

DETAILED DESCRIPTION OF THE DRAWINGS

In accordance with a first mode of operation of the present invention, a portrait image is received from a system device. The portrait image is translated and stored within the graphics engine memory such that it can be displayed on a landscape monitor that has been rotated 90 degrees. Likewise, when portrait data stored within the memory is sent to the system it is translated such that it is sent to the system in a traditional landscape format. In a second mode of operation in accordance with the present invention, a landscape image received by the graphics adapter is stored in the graphics adapter memory without any translation.

Figure 1:
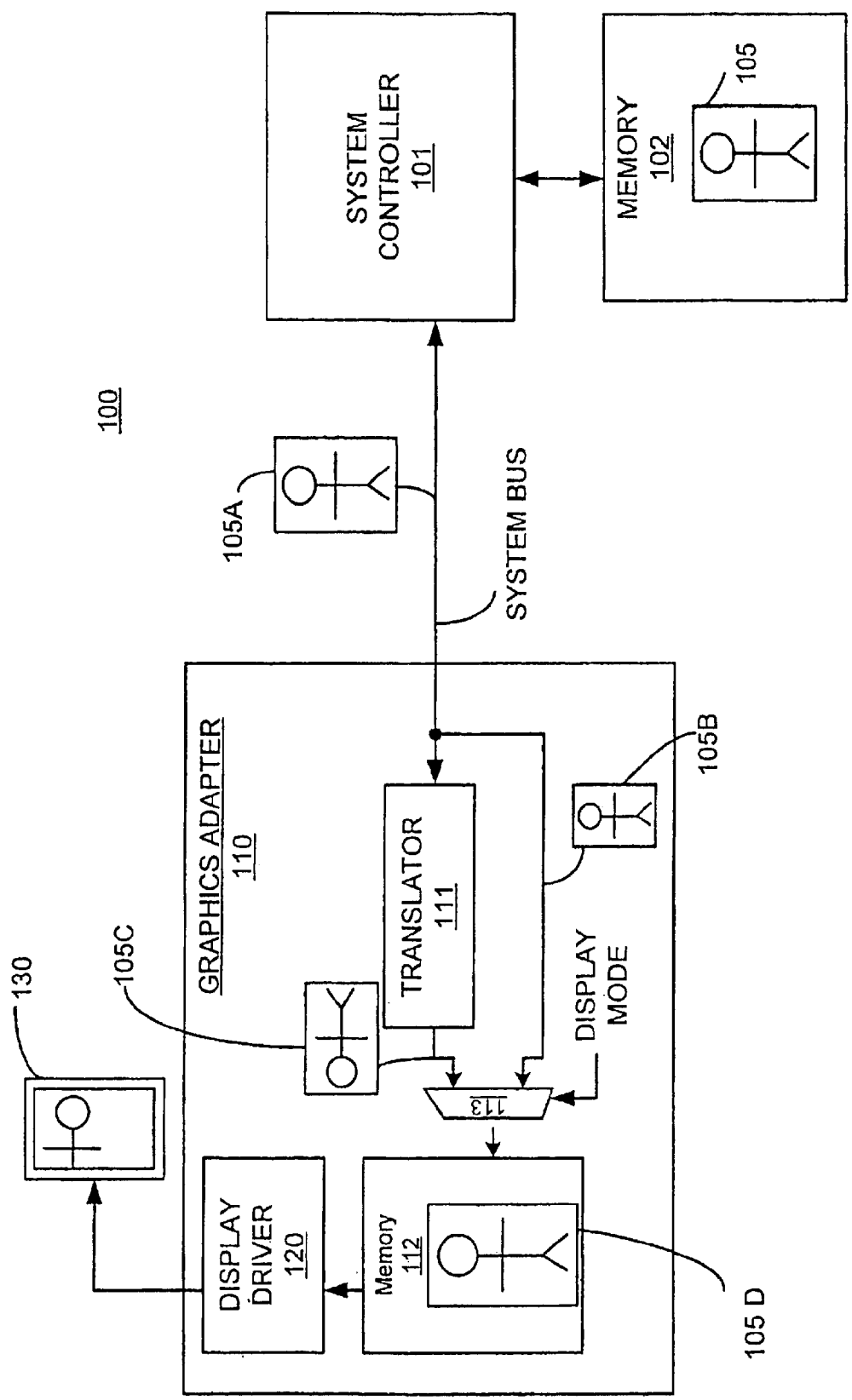
FIG. 1 illustrates, in block diagram form, a specific implementation in accordance with the present invention operating in a first display mode.

The present invention is best understood with reference to the specific embodiments illustrated in FIGS. 1–11. FIG. 1 illustrates a system 100 in accordance with the present invention. The system 100 represents a computer system having a system controller 101, a memory 102, a system bus, a graphics adapter 110, and a monitor 130.

In operation, the system controller 101 represents a general purpose processing device, such as a central processing unit (CPU) of a computer system. In accordance with the present invention, when it is desired to display an image in portrait mode, the system controller will access the image 105 from a memory 102. Generally, the memory 105 is associated with the system controller 101 and is not accessible to the graphics adapter 110. The system controller 101 transmits the portrait image 105 to the graphics adapter 110. As illustrated, the image 105 is transmitted as a portrait image. Image representation 105A indicates that the image is being transmitted in portrait mode. Images, whether portrait or landscape, are transmitted line by line, beginning with the top line. The transmitted portrait image 105A is received by the graphics adapter 110 and displayed as a portrait image on the landscape display device 130.

The graphics adapter 110 is capable of displaying either portrait images such as image 104A, or landscape images received by the system controller 101 (not illustrated). Proper handling of portrait and landscape images is achieved by mapping, or translating, received portrait images into a memory for proper display on the monitor 130. However, landscape images are unchanged. The graphics adapter 110 is capable of handling this translation.

Graphics adapter 110 comprises a translator 111, multiplexor 113, a memory 112, and a display driver 120. Images received from the system bus are provided to the translator 111, and to a first input of the multiplexor 113. The output of the translator 111 is coupled to a second input of the multiplexor 113. The multiplexor 113 is controlled by a signal labeled DISPLAY MODE which indicates the display mode of monitor operation. The output of the multiplexor 113 is coupled to the memory 112 for providing data to the memory 112. The memory 112 is further coupled to the display driver 120, which accesses data images stored in memory 112 and provides the images to the display device 130 for actual display.

In landscape mode of operation, the DISPLAY MODE signal selects the node having image 105B which is not translated. As a result, the image 105B will be stored in the memory 112. The received image 105A, which happens to be a portrait image, is stored as the stored image 105D.

The display driver 120 is a traditional display driver, which supports horizontal scan line display devices, such as display device 130. Given a memory location identifying a first pixel, the display device screen size, and pixel depth of the image, the display driver 120 can transmit the necessary image data to the monitor. Display device 130 has been rotated 90 degrees clockwise in order to provide a portrait view. Because the image 105A has been stored in portrait mode as stored image 105D without being remapped, the monitor 130 will display only a portion of the stored image 105D, and the displayed portion will be viewed as rotated by 90 degrees. This truncated and rotated result will be discussed in greater detail with reference to FIG. 3. It should be apparent, that if the image 105 were a landscape image, and the display device 130 were not rotated by 90 degrees, that a proper image would be displayed.

Figure 2:
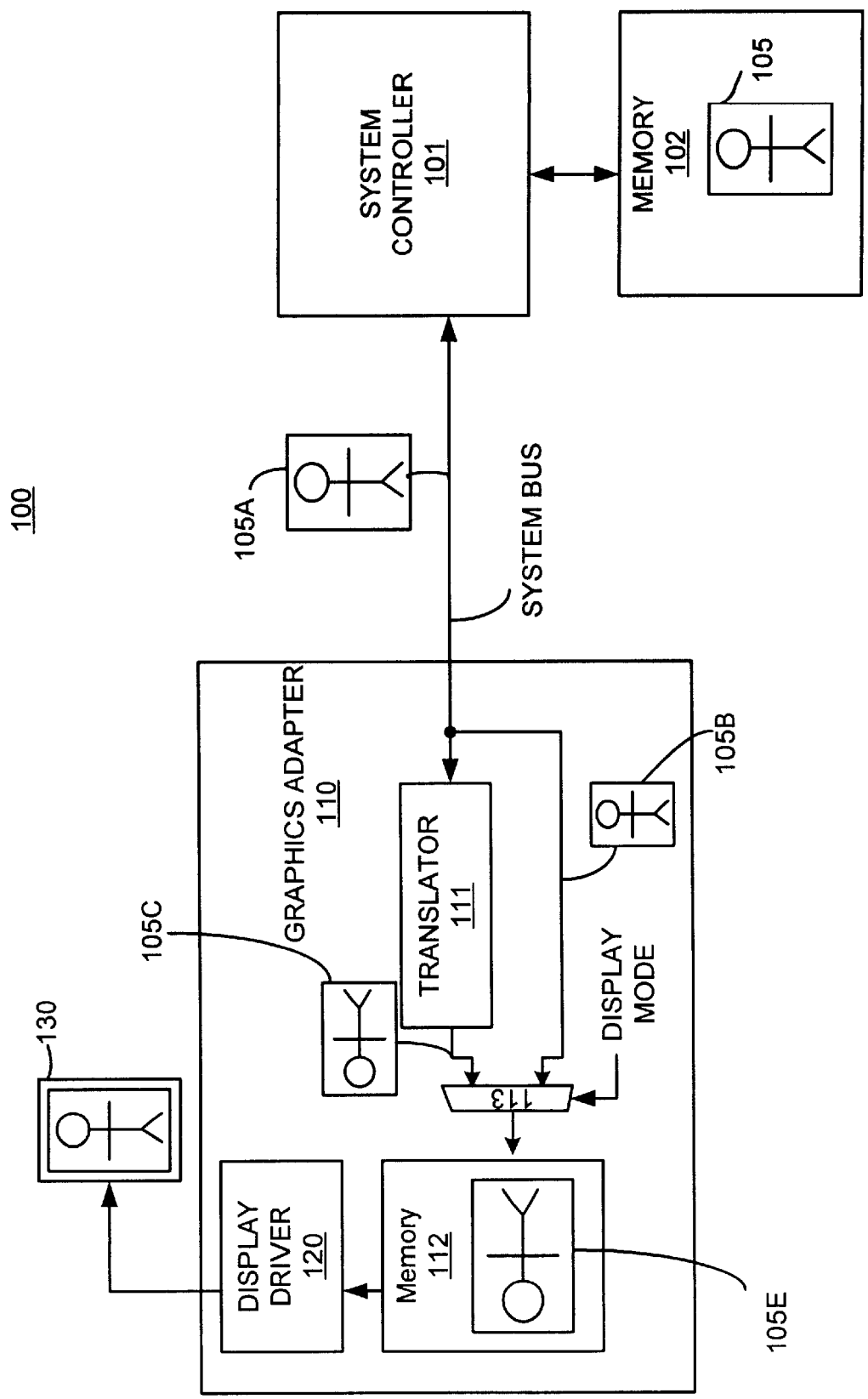
FIG. 2 illustrates, in block diagram form, a specific implementation in accordance with the present invention operating in a second display mode.

FIG. 2 illustrates a portrait mode of operation, the DISPLAY MODE signal selects the multiplexor 113 input that is received from the translator 111. As a result, the received image 105A will be stored in the memory 112 as stored image 105E. The received image 105A, which is a portrait image, is stored as the stored image 105E.

As with FIG. 1, display device 130 has been rotated 90 degrees clockwise in order to provide a portrait view. As a result of the received image 105A being remapped prior to being stored as stored image 105E, the monitor 130 will properly display the portrait image on the rotated screen. This result is discussed in greater detail with reference to FIG. 4.

Figure 3:
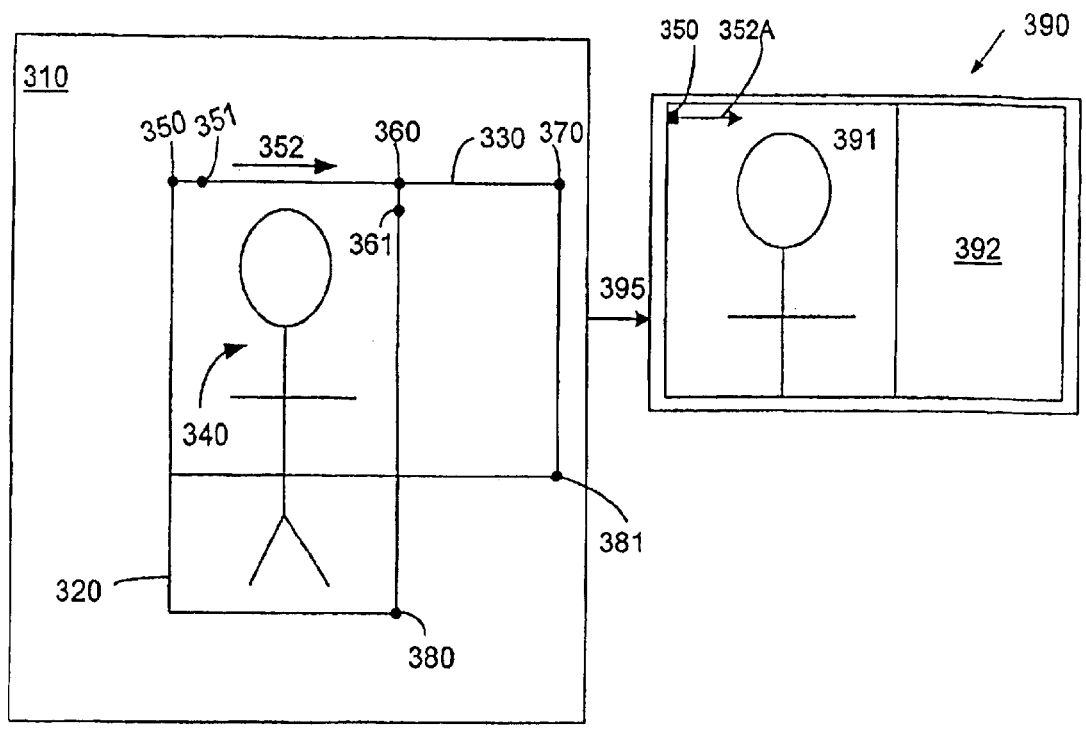
FIG. 3 illustrates an image having a first orientation stored in memory and displayed upon a landscape oriented display device.

FIG. 3 illustrates memory 310, which is analogous to memory 112 of FIGS. 1 and 2, for storing images, and display device 390 for displaying images stored within the memory 310. The memory 310 contains a portrait image 340 that has been stored directly without a translation. The image is bound by portrait display area 320, which has, relative to the image orientation, a storage location 350 for storing an upper-left most pixel, and a storage location 380 for storing a lower-right most pixel. The display area 320 includes the data locations associated with one frame of portrait data. The area 330 within the memory 310 represents a landscape display area associated with one frame of landscape data, and relative to the image orientation, has an upper-left most pixel 350 and a lower-right most pixel 381.

The display device 390 is a landscape display device. A landscape display device provides an image by generating horizontal scan lines across the widest monitor dimension. In normal operation horizontal scan line provides individual pixels comprising a single line, where the pixels are to be viewed horizontally adjacent to each other when in landscape mode.

Scan line information is received by a display driver represented by the arrow 395. The display driver 395 supports a landscape mode of operation, in that it provides horizontal scan line data to the display device 390. Such a display driver retrieves a first horizontal scan line including at a top left pixel, stored at location 350, and proceeds in the direction 352 until the top right pixel has been accessed at location 370. Memory location 370 represents the location where last pixel associated with a horizontal scan line should be stored.

The image 340 was stored such that the first pixel of its first scan line is stored at location 350, while its last pixel of the first scan line is stored at location 360. When the display device 395 retrieves the image 340, it will begin at the pixel data stored at location 350. However, the display device 395, will not recognize location 360 as the last pixel location because it is a landscape display driver. Therefore, for each scan line, the driver 395 will access the data in locations between and inclusive of location 350 and location 370. The image data past the column inclusive of locations 360 and 361 will contain data of an unknown origin. This is represented as the image area 392 on the display device 390. In addition, the image 340 will be truncated because portrait images have a greater number of vertical scan lines than landscape images.

Figure 4:
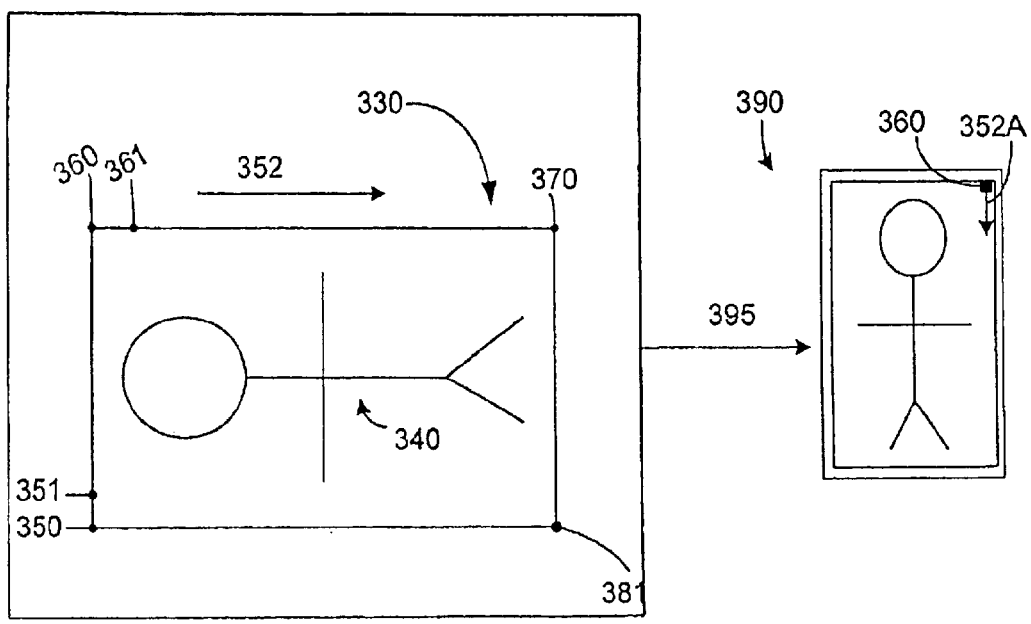
FIG. 4 illustrates the image of FIG. 3 remapped and displayed upon a portrait oriented landscape display device.

FIG. 4 illustrates the memory 310 containing the portrait image 340 that has been translated, or remapped. The image 340 is now bound by the display area 330 which corresponds to the landscape display area. Because of the re-mapping, the pixel stored at location 360 of FIG. 4 is actually the upper right pixel of the image 340. Therefore, when the display driver 395 retrieves the first scan line, the scan line will actually contain pixels to be viewed vertically on the display device 390 with respect to one another as indicated by the scan line direction indicator 352A.

By translating the received portrait data into a different memory space as indicated, it is possible for the same display driver 395 and display device 390 to be used for bother landscape and portrait modes of operation. This memory mapping translation technique can be better understood with reference to FIG. 5.

Figure 5:
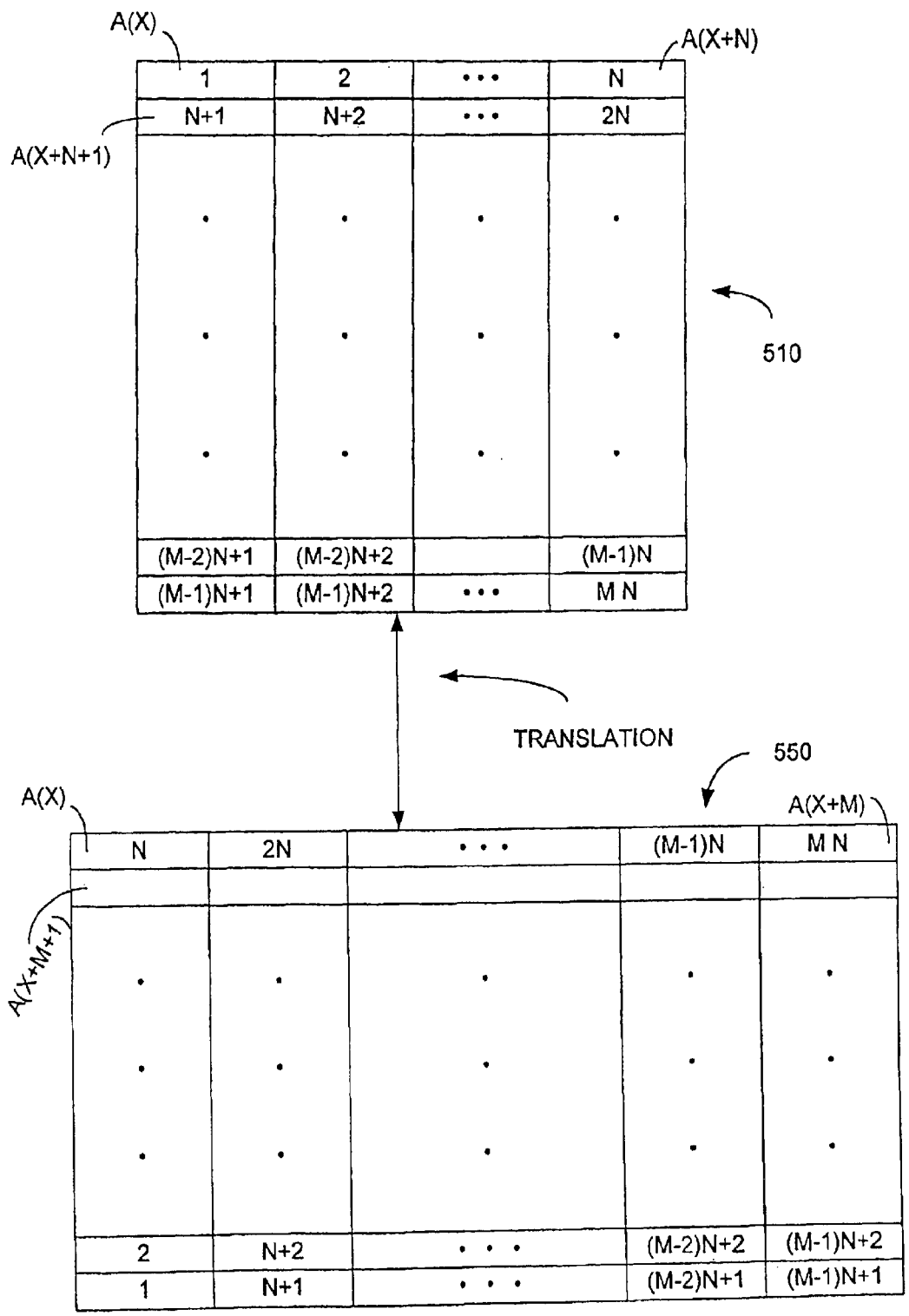
FIG. 5 illustrates a memory mapping of individual pixels in 2 display modes.

FIG. 5 illustrates a memory mapping translation from a received data address space 510 representing a received portrait image such as image 105A of FIG. 1, to stored data within address space 550, representing the stored portrait image after translation.

The address space of the received data 510 corresponds roughly to the portrait display area 320 of FIG. 3. The address space of data 510 includes logical address locations $A(X)$ through $A(X+N)$ for a first row of data that is to be viewed horizontally. The data stored in the row beginning at address location $A(X)$ is pixel data, and is represented by the values 1, 2 through N. N represents the number of pixels associated with the horizontal viewing width of the image.

Referring to FIG. 3, the location 350 corresponds to location A(X) of FIG. 355, while location 360 corresponds to the location A(X+N) of FIG. 5.

The second scan line associated with the received data 510 begins at address location A(X+N+1) and continues to address location (2N). The address location A(X+N+1) is generally stored in a memory location that is logically adjacent to the address location A(X+N). In this continued manner, the received image is stored until the last row of data to be viewed horizontally is received. This last row has a first stored pixel value represented by (M−1)N+1 and a last stored pixel value represented by MN.

As discussed with reference to FIG. 3, a portrait image stored in this manner in memory space will be truncated. Therefore, a translation needs to occur between the portrait image received and the portrait image stored such that the image can be properly displayed in landscape mode.

The memory space 550 represents a specific embodiment of a properly translated portrait image to be viewed using a landscape display driver and display device. Specifically, the first scan line, which for illustrated purposes begins with the logical address location A(X), now contains pixel N. The pixel 2N is stored in the immediately adjacent logical address location A(X+1). Likewise, the first scan line will contain the pixels associated with the right most column of received data 510. In a similar manner, the first pixel column of the received image 510 becomes the last scan line of stored image 550.

By performing a translation in this manner, the first scan line corresponds to a column of data which is viewed vertically on the display. This is illustrated in FIG. 4, where the first scan line begins with pixel 360 and proceeds in a vertical manner down the right side of the monitor as indicated by 352A.

FIG. 6 represents the linear mapping space associated with the image 510 and 550 of FIG. 5. The left most column indicates consecutive address locations beginning at X proceeding to X+MN. It will be understood, that the address values X through X+MN represent logically adjacent addresses. It would be further understood, that the physical spaces, while generally being sequential, need not necessarily be so. The center column indicates the pixel stored at a specific address location when no translation occurs. The third column indicates the pixel stored at the corresponding location following the translation.

As illustrated, without a translation, the pixel 1 would be stored at the address location X. Following the translation, the pixel content value N is stored at the address location X. In the manner illustrated in FIG. 6, it is possible to perform a translation to allow for a portrait image to be displayed upon a traditional display device using a landscape display driver. It would be understood by one of ordinary skill in the art, that where the display device is rotated other than clockwise, the translation would differ. Note, it should be understood that the address values are used for illustration purposes and assume a received non-translated image would be stored beginning at the same address location as a translated image.

Figure 7:
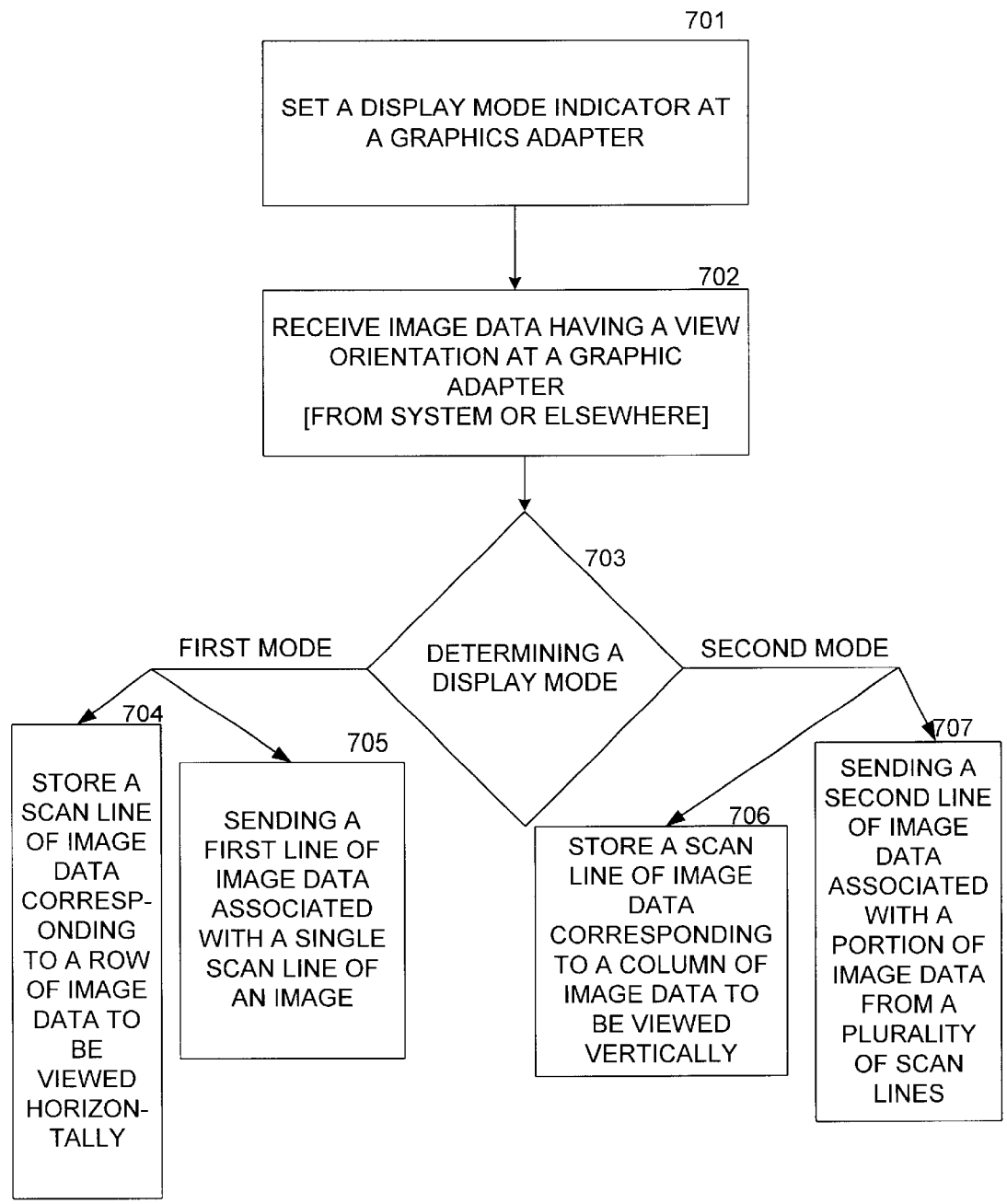
FIGS. 7, 8 and 9 illustrate specific methods in accordance with the present invention.

FIG. 7 illustrates a method in accordance with the present invention. At step 701, a display mode indicator is set. Generally, the indicator will be set at the graphics device, however, it may be received on an as needed bases, and not actually a set value. The display mode indicator corresponds to the display mode signal in FIG. 1 which controls the selection made by the multiplexor 113 between the translated signal and the non translated signal. Generally, the display mode indicator is determined by a user that indicates the mode of monitor operation. In addition, the indicator can be provided by a system, or be provided by the monitor which detects its current orientation.

Once the display mode indicator is set, it will be possible for the graphics adapter to determine which mode of operation it is to operate within. At step 702, an image having a view orientation is received at the graphics adapter. Generally, this image will be received from a system CPU. The view orientation of the received image can be either a portrait view orientation, or a landscape view orientation.

At step 703, a determination is made as to the display mode. Generally, such determination will be made by reading a value from a register. However, in other specific embodiments, a physical switch, or other electronic indicator can be used in order to indicate whether or not a first mode of operation or a second mode of operation is currently being used.

For the specific embodiment of FIG. 7, the first mode of operation corresponds to a landscape mode, while the second mode of operation corresponds to a portrait mode. When in a first mode of operation, one or both of steps 704 and 705 can be implemented. Step 704 corresponds to receiving a scan line of information from a system. At step 704 a scan line of image data corresponding to a row of image data to be viewed horizontally is stored. A scan line of image data is viewed horizontally when the received image is to be displayed in a landscape mode, which corresponds to a normal mode of operation. When in landscape mode, data to be viewed horizontally is provide the scan line.

At step 705, a first line of data associated with a single scan line of an image is sent to the system. In order to accomplish this, the translator 111 is configured to operate in either of a send and receive mode. When operating in a landscape mode, the image is transmitted to the system without any translation.

During the second mode of operation, at step 706, a scan line of image information is stored that corresponds to a column of image data to be viewed vertically. Referring to FIG. 4, the scan line beginning at location 360 and ending at location 370 needs to be stored. This scan line provides data on the display device 390 that is to be viewed vertically. This is represented by the direction of the scan line 352 associated with the display device 390 of FIG. 4. This is different than the storing of a landscape scan line which represents data to be viewed horizontally.

Step 707 describes the step for sending data to a system when in a portrait mode. Each line of information requested by the system, actually will correspond to a plurality of scan lines. This is best understood with reference to FIG. 4. As illustrated by the image in the display device 390 of FIG. 4, the top row of information being viewed horizontally is actually the combination of one pixel of a plurality of scan lines. Therefore, when the data is transmitted to the system, it would be necessary to translate the information such that the row of data sent to the system comprises one bit from each of the scan lines. In this manner, the system receives an image oriented in the same manner at which it would have been originally provided.

Figure 8:
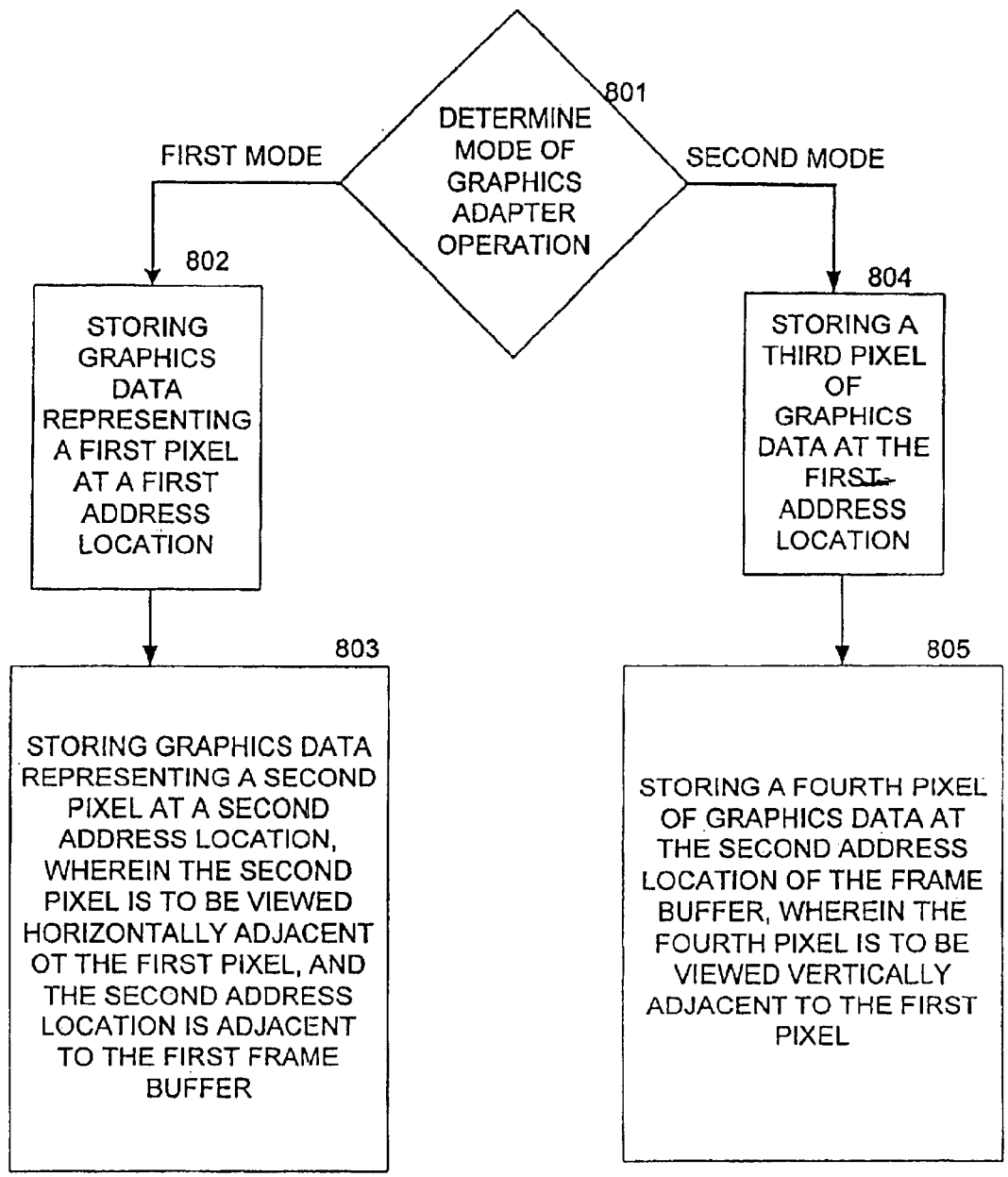

FIG. 8 illustrates another method in accordance with the present invention. At step 801, a determination is made as to the mode of graphics adapter operation. At step 802, which corresponds to a landscape mode of operation, graphics data representing a 1st pixel at a 1st address location is stored. For example, referring to FIG. 6, the pixel 1 would be stored at the address location X. At step 803, a graphics data representing a second pixel is stored at a 2nd address location. However, the 2nd pixel is to be viewed horizontally adjacent to the first pixel on a display device, and the 2nd address location is adjacent to the 1st address location. Referring to FIG. 6, address location X+1 is adjacent to the address location X, and contains the pixel representation 2. During a landscape mode of operation, the pixel 1 and pixel 2 are to be viewed horizontally to one another.

During a second mode of operation, which represents a portrait mode of operation, at step 804 a third pixel of graphics data is stored at the first address location. Referring to FIG. 6, this corresponds to the pixel represented by N being stored at the address X. At step 805, a fourth pixel of graphics data is stored at the second address location. However, the fourth pixel is to be viewed vertically adjacent to the first pixel. This corresponds to the pixel represented by 2N being stored at the address location X+1. As discussed with reference to FIG. 4, the pixels N and N+1 will be viewed vertically adjacent to one another.

The method of FIG. 8 represents an advantage over the prior art, in that it provides varying modes of graphics adapter operation for controlling how image data is stored within memory in order to support multiple modes of operation. This is an advantage over the prior art, which provides the translation to occur outside of the graphics adapter by the system.

Figure 9:
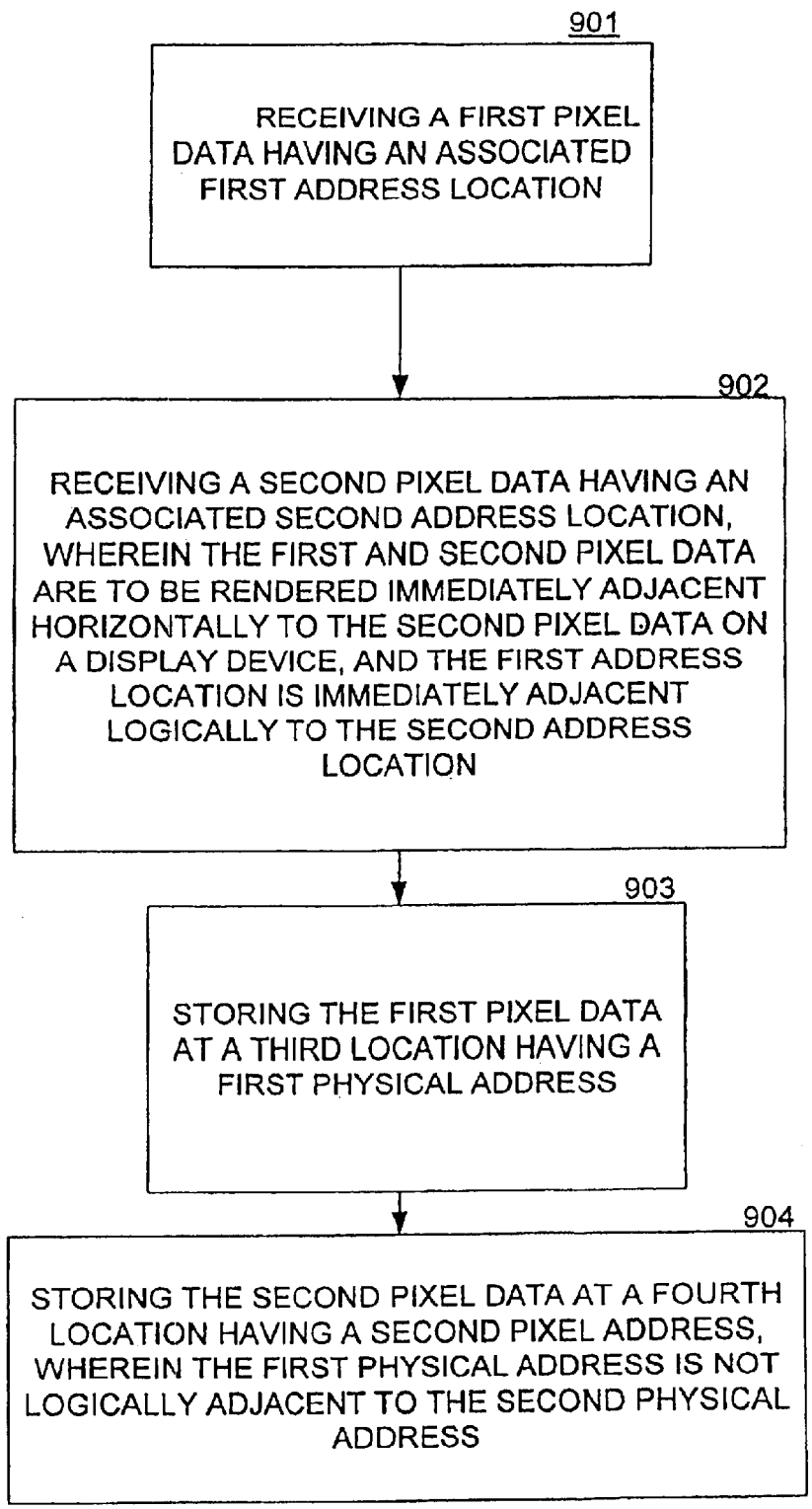

FIG. 9 represents a method in accordance with the present invention. At step 901, a $1^{st}$ pixel data associated with the $1^{st}$ address location is received. At step 902, a $2^{nd}$ pixel data associated with the $2^{nd}$ address location is received. The relationship between the $1^{st}$ and $2^{nd}$ pixel data is such that they are rendered immediately adjacent on one another in order to be viewed horizontally adjacent to one another on a display device. In other words, assuming the image data being received is in portrait mode, the $1^{st}$ pixel data can correspond to pixel 350 of FIG. 3, while the $2^{nd}$ pixel data would correspond to pixel 351. These pixels are intended to be viewed horizontally to one another on a display device. However, the pixels are received by the video graphics adapter such that they are associated with immediately adjacent address locations. In other words, the sending device would generally send the $1^{st}$ pixel and the $2^{nd}$ pixel immediately adjacent to one another, such that there were no other pixels received in between.

Steps 903 and 904 indicate how the pixels receive at steps 901 and 902 are stored. At step 903, the $1^{st}$ pixel data is stored at a $3^{rd}$ location having a $1^{st}$ physical address. At step 904, the $2^{nd}$ pixel data is stored at a $4^{th}$ address location having a $2^{nd}$ physical address, wherein the $1^{st}$ physical address is not logically adjacent to the $2^{nd}$ physical address. In other words, while the received data had logically adjacent addresses associated with the respective $1^{st}$ and $2^{nd}$ pixel data, in implementation the $1^{st}$ and $2^{nd}$ pixel data are stored in non logically adjacent data locations. This can be observed referring to FIG. 6. When a portrait image is received, the pixels to be viewed horizontally adjacent to one another will be stored in logically adjacent memory locations. In other words, a first pixel would have an associated address location that would be adjacent to an associate address location of received bit 2 (see center column of FIG. 6). However, following the translation, none of the adjacently received pixels are stored in logically adjacent addresses, as can be viewed by the $3^{rd}$ column labeled contents with translation.

The method of FIG. 9 illustrates a specific translation method in accordance with the present invention, whereby using the video graphics adapter to store the received pixels in a different order, it is possible to realize the advantages of the present invention.

Figure 10:
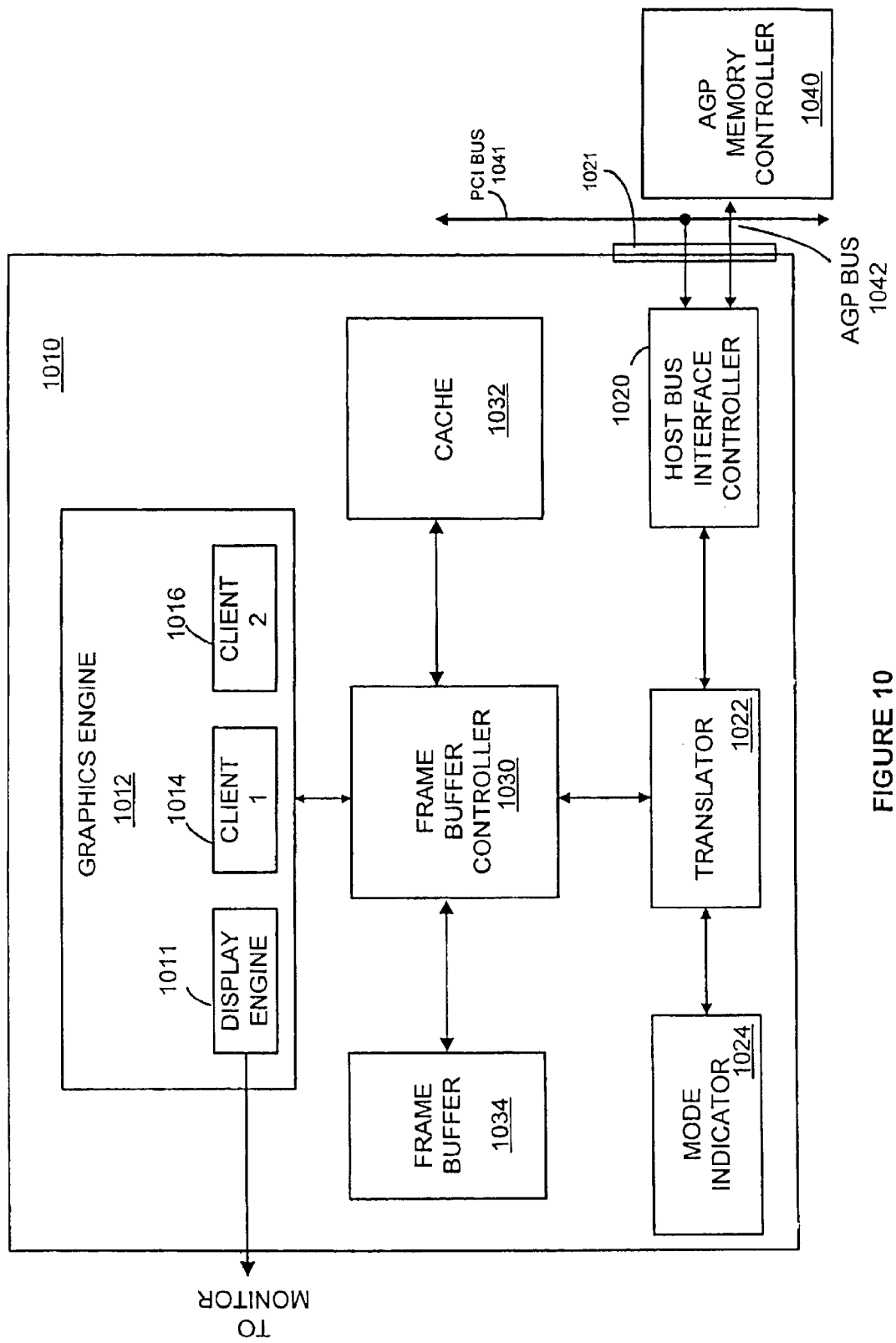
FIG. 10 illustrates, in block diagram form, a specific implementation of the present invention.

FIG. 10 illustrates a specific embodiment of the present invention. FIG. 10 includes a graphics adapter 1010, which is connected to external system buses. The external system buses include a PCI bus 1041, and an AGP memory controller 1040. By interfacing to these external buses through a system interface port 1021, data can be received for display directly from the system. Such data received from the system is received by the host bus interface controller 1020. The host bus interface controller 1020 is coupled to the translator 1022. The translator 1022 receives a mode indicator value from a mode indicator module 1024 and based upon that value provides a data translation to the frame buffer controller 1030. The frame buffer controller 1030 stores received information into memory.

The memory can be of several types of memory. For example, the memory can include the frame buffer memory 1034, a cache memory 1032, or even other memory which is capable of being accessed directly by the frame buffer controller 1030. In addition, the frame buffer controller 1030 is coupled to the graphics/video engine 1012. The graphics engine 1012 includes clients 1011, 1014, and 1016. Client 1011 is a display engine client responsible for receiving display data from memory and providing it to the monitor.

The translator 1022 can be implemented using a wide variety of techniques to translate the address values in the manners discussed herein. For example, in one embodiment the translator 1022 can comprise combinational logic whereby received addresses would be converted into secondary addresses based upon the combinational circuitry. Likewise, translator 1022 can comprise state machines, lookup tables, or even microcode or firmware capable of being executed on dedicated processors associated with the graphics controller.

In a specific embodiment, the implementation of translator 1022 will implement the following equations:

$$Ap=[(yp*P)+XP]*D \quad (1)$$

$$Xp=MOD(Ap/D,P) \quad (2)$$

$$Yp=(Ap/D-Xp)/P \quad (3)$$

$$AL=[(W-1-Xp)*H+Yp]*D \quad (4)$$

where:
Xp, Yp—Coordinate of a pixel in portrait mode.
XL, YL—Coordinate of a pixel in landscape mode.
Ap—Application provided address of a pixel (Xp, Yp)
AL—Translated address of a pixel (Xp, Yp)
P—Pitch of the portrait mode display in terms of pixels, as seen by the application
H—Pitch of the portrait mode display in terms of pixels, as used by the display engine
D—Pixel depth in terms of bytes
W—W=P resolution of the traditional landscape display device in lines or pixels While the specific equations disclosed assume the monitor has been rotated in a clockwise manner, other equations are anticipated which would allow for other orientations of the monitor from landscape mode. In addition, the translator and memory controller need to be able to efficiently manipulate data of the appropriate depth. For example, bytes of data where the depth of a pixel is one byte, or a nibble of data, where the depth of the data is less than one byte. Such implementation are readily implemented by one of ordinary skill in the art.

Figure 11:
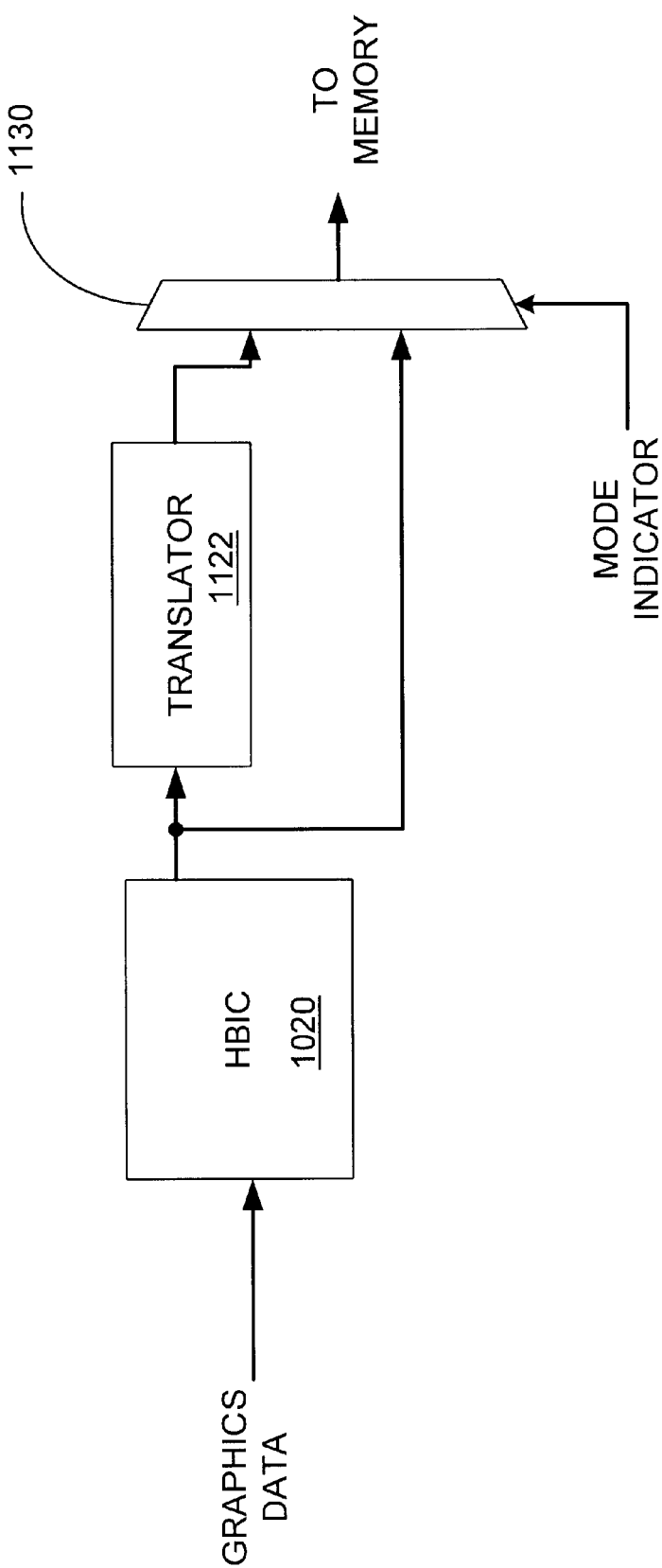
FIG. 11 illustrates, in block diagram form, a specific implementation of a portion of the system of FIG. 10.

It should now be apparent that the present invention allows for a graphics adapter implementation supporting both portrait and landscape modes of monitor operation. Furthermore, it should be apparent that this is advantageous over the prior art, in that it frees up CPU bandwidth by performing the translation on VGA hardware. It should also be apparent that many specific implementations of the present invention can be envisioned. For example, FIG. 11 illustrates a specific implementation, whereby the graphics data is received by the host bus interface controller 1020, provided to a translator 1122 and also provided directly to a multiplexor 1030. In this manner, the mode indicator would select which of the 2 paths, the translated path, or the non translated path, to be displayed. In addition, it would be understood that the translation function can be incorporated either partially or completely within the host bus controller, within the frame buffer controller or within other locations. Furthermore, it is understood, that the translator can operate in a bidirectional mode. In other words, the translator 1022 can provide properly translated images to not only the frame buffer, but also back to the system bus.

We claim:

1. A method for transmitting graphics data, the method comprising:
   (a) receiving image data at a graphics adapter;
   (b) setting a display mode to one of a first mode and a second mode in response to a user-indicated monitor mode;
   (c) receiving an Nth pixel data of an Nth scan line having an associated Nth address location;
   (d) receiving an N plus one pixel data of an N plus one scan line having an associated N plus one address location, wherein the Nth and the N plus one pixel data are to be rendered immediately adjacent horizontal to one another on a display device, and the Nth address location is immediately adjacent logically to the N plus one address location;
   (e) storing the Nth pixel data at an Mth address location having an X physical address;
   (f) storing the N plus one pixel data at an M plus one address location having an X plus one physical address, wherein the X physical address is not logically adjacent to the X plus one physical address;
   (g) incrementing N, M and X by two;
   (h) automatically repeating steps (c)–(g) a number of times equal to a number of scan lines minus one of an image to be displayed without first determining the number of scan lines in the image
   (i1) when in a first display mode:
      storing the scan line of image data corresponding to a row of image data to be viewed horizontally;
   (i2) when in a second display mode:
      storing the scan line of image data corresponding to a column of clockwise translated image data to be viewed vertically.

2. The method of claim 1, wherein the graphics adapter includes at least a portion of a monolithic semiconductor.

3. The method of claim 1, wherein the graphics adapter includes a peripheral card.

4. The method of claim 1, wherein the steps of storing include storing the scan line in a frame buffer.

5. The method of claim 1, wherein first display mode is a landscape mode and the second display mode is a portrait mode.

6. The method of claim 1, wherein the image data is rotated 90 degrees clockwise.

7. A method for transmitting data from a video graphics adapter, the method comprising:
   (a) setting a display mode to one of a first mode and a second mode in response to a user-indicated monitor mode;
   (b) receiving an Nth pixel data of an Nth scan line having an associated Nth address location;
   (c) receiving an N plus one pixel data of an N plus one scan line having an associated N plus one address location, wherein the Nth and the N plus one pixel data are to be rendered immediately adjacent horizontal to one another on a display device, and the Nth address location is immediately adjacent logically to the N plus one address location;
   (d) storing the Nth pixel data at an Mth address location having an X physical address;
   (e) storing the N plus one pixel data at an M plus one address location having an X plus one physical address, wherein the X physical address is not logically adjacent to the X plus one physical address;
   (f) incrementing N, M and X by two;
   (g) automatically repeating steps (c)–(g) a number of times equal to a number of scan lines minus one of an image to be displayed without first determining the number of scan lines in the image
   (h1) when in a first display mode,
      sending a first line of image data associated with a single horizontally-viewed line of an image; and
   (h2) when in a second display mode,
      sending a second line of image data associated with a portion of clockwise translated image data from a plurality of horizontally-viewed scan lines, wherein the portion of image data from the plurality of scan lines includes data from one pixel of each of the plurality of scan lines.

8. A method for storing data on a graphics system, the method comprising:
   (a) receiving an Nth pixel data of an Nth scan line having an associated Nth address location;
   (b) receiving an N plus one pixel data of an N plus one scan line having an associated N plus one address location, wherein the Nth and the N plus one pixel data are to be rendered immediately adjacent horizontal to one another on a display device, and the Nth address location is immediately adjacent logically to the N plus one address location;
   (c) storing the Nth pixel data at an Mth address location having an X physical address;
   (d) storing the N plus one pixel data at an M plus one address location having an X plus one physical address, wherein the X physical address is not logically adjacent to the X plus one physical address;
   (e) incrementing N, M and X by two; and
   (f) automatically repeating steps (a)–(e) a number of times equal to a number of scan lines minus one of an image to be displayed without first determining the number of scan lines in the image.

9. The method of claim 8, wherein the step of receiving the Nth data includes receiving the Nth data from a system bus.

10. The method of claim 8, wherein the step of receiving the N plus one pixel data includes receiving the N plus one pixel data immediately adjacent to the Nth pixel data, such that no other pixel data is received between the Nth and N plus one pixel data.

11. The method for storing data on a graphics system of claim 8, the method further comprising:
   (g) automatically repeating step (f) a number equal to the number of pixel data in the scan line of the image without determining the number of pixel data in the scan line.

* * * * *